(12) United States Patent
Philipsz

(10) Patent No.: US 9,369,464 B2
(45) Date of Patent: Jun. 14, 2016

(54) SCALABLE AUTHENTICATION SYSTEM

(71) Applicant: DISTRIBUTED MANAGEMENT SYSTEMS LTD., Lancashire (GB)

(72) Inventor: Basil Philipsz, Lancashire (GB)

(73) Assignee: DISTRIBUTED MANAGEMENT SYSTEMS LTD., Blackburn (GB)

( * ) Notice: Subject to any disclaimer, the term of this patent is extended or adjusted under 35 U.S.C. 154(b) by 37 days.

(21) Appl. No.: 14/382,942

(22) PCT Filed: Feb. 14, 2013

(86) PCT No.: PCT/GB2013/050341
§ 371 (c)(1),
(2) Date: Sep. 4, 2014

(87) PCT Pub. No.: WO2013/132224
PCT Pub. Date: Sep. 12, 2013

(65) Prior Publication Data
US 2015/0046695 A1    Feb. 12, 2015

(30) Foreign Application Priority Data
Mar. 9, 2012 (GB) .................................. 1204202.4

(51) Int. Cl.
*H04L 29/06* (2006.01)

(52) U.S. Cl.
CPC ............ *H04L 63/0853* (2013.01); *H04L 63/06* (2013.01)

(58) Field of Classification Search
CPC ........................ H04L 63/0823; H04L 63/0428
USPC ........................................................ 713/155
See application file for complete search history.

(56) References Cited

U.S. PATENT DOCUMENTS

2002/0071567 A1*  6/2002  Kurn ....................... H04L 9/083
                                                                  380/286
2006/0053302 A1    3/2006  Yasaki et al.
(Continued)

FOREIGN PATENT DOCUMENTS

WO    2007028099 A2    3/2007
WO    2009137621 A1    11/2009
(Continued)

OTHER PUBLICATIONS

Patent Cooperation Treaty, The International Search Report and the Written Opinion of the International Searching Authority, or the Declaration for PCT/GB2013/050341 date of mailing Oct. 15, 2013, 15 pages.
(Continued)

*Primary Examiner* — Anthony Brown
(74) *Attorney, Agent, or Firm* — Hoffman Warnick LLC

(57) ABSTRACT

Disclosed is a key management method for administering a token with an administrative server and an authentication server wherein a set of keys stored therein in use differs so that at least a mutually exclusive key is stored in each of the token, the administrative server or the authentication server, the method comprising the steps of: the token transmitting an identity proxy ID 1 encrypted with an encryption key Key 1; the administrative server generating data Key 1a and Key 1b from Key 1 stored therein, whereby Key 1a and Key 1b can be used in conjunction to derive Key 1 but not separately; the administrative server generating an identity proxy ID 2 and an encryption key Key 2, whereby the administrative server records a token profile comprising an association information among ID 2, Key 1b and Key 2; the administrative server communicating ID 2, Key 1a and Key 2 to the token and the token storing ID 2, Key 1a and Key 2 wherein Key 2 is stored therein encrypted with Key 1; the administrative server communicating the token profile to the authentication server and deleting Key 1b and Key 2 from its records thereafter; the authentication server requesting ID 2 from the token and the token transmitting ID 2 thereto; the authentication server identifying Key 1b and Key 2 associated with the transmitted ID 2 and generating a new encryption key Key 3; the authentication server recording Key 3's association with ID 2 in the token profile and communicating Key 3 to the token; and the token storing Key 3 therein encrypted with Key 2, whereby the administrative server stores ID 1, ID 2 and Key 1, the authentication server stores ID 2, Key 1b, Key 2, and Key 3, and the token stores ID 1, ID 2, Key 1a, Key 2, and Key 3, wherein the token stores Key 2 encrypted with Key 1 and stores Key 3 encrypted with Key 2 therein.

19 Claims, 6 Drawing Sheets

(56) References Cited

U.S. PATENT DOCUMENTS

| | | |
|---|---|---|
| 2007/0261114 A1* | 11/2007 | Pomerantsev .... G06F 17/30867 726/12 |
| 2008/0022361 A1 | 1/2008 | Bharadwaj et al. |
| 2009/0245522 A1 | 10/2009 | Kudo et al. |
| 2013/0311055 A1 | 12/2011 | Parann-Nissany |

FOREIGN PATENT DOCUMENTS

| | | |
|---|---|---|
| WO | 2010094125 A1 | 8/2010 |
| WO | 2011024298 A1 | 3/2011 |

OTHER PUBLICATIONS

Great Britain Intellectual Property Office, Search Report under Section 17(5) for GB Application No. 1204202.4 mailed Nov. 5, 2012, 4 pages.

* cited by examiner

SCALABLE AUTHENTICATION SYSTEM

The present invention relates to a scalable authentication system and related devices and methods, suitable for providing secure remote access wherein the host can authenticate the user and the user can authenticate the host when required. The authentication system facilitates an easily scalable maintenance of the authentication system wherein an administrator of the authentication system can update and alter the credentials and parameters of the authentication system with ease.

As mobility continues to play a key role in enabling companies to achieve greater productivity worldwide, there is an increasing need for users to have secure remote access to privileged data. One way of achieving this secure remote access is by a deployment of an authentication system. Public key encryption and/or a plurality of biometric readers are often used in such authentication systems to supply the desired security.

However such authentication systems suffer from inherent vulnerabilities arising from the necessity of inter-parties trust in either sharing or storing of the keys, such as encryption keys or biometric data, to be utilised in the authentication system. Such trust is difficult to maintain when deliberate attempts at circumventing such an authentication system are likely to occur. These attempts may be facilitated by an accidental compromise, a malware surreptitiously embedded in a workstation or even with internal collusion, followed by a repudiation defence.

Removal of the need for a hierarchy of trust and the need for a revocation procedure for compromised private keys can therefore be very useful. Symmetric-encryption-based authentication systems can provide this but they have not been widely adopted due to the administrative overhead involved in the key distribution and key change.

It is an aim of embodiments of the present invention to address these and other issues with the prior art.

According to the present invention there is provided an apparatus, a system and method as set forth in the appended claims. Other features of the invention will be apparent from the dependent claims, and the description which follows.

According to a first aspect of the present invention, there is provided an authentication method for authenticating a token with a computer system, the method comprising the steps of: displaying on the token a message to a user in response to the receipt of a data input to the token from a local computer screen; the user entering, into a local keyboard, the message; and allowing access to the computer system if the message entered into the local keyboard matches that expected by the computer system, whereby the token's possession of an encryption key Key 3 used for generating the data input is verified, wherein the data input from the computer system further comprises Key 1b (t) to be used in conjunction with Key 1a (t) stored in the token to derive Key 1 (t) whereby the token decrypts an encryption key Key 2 using Key 1 (t), and Key 2 is used to decrypt Key 3 stored in the token so that the message to the user can be generated using Key 3.

Preferably, the data input from the computer system may be communicated to the token through an optical sensor 100. Preferably, the data input from the computer system may be communicated to the token by the local computer screen displaying an image to be sensed by the token's optical sensor 100. Preferably, the displayed image may comprise a pattern. Preferably, the displayed image may comprise a changing pattern over time.

Preferably, the authentication method may further comprise a step of: the computer system requesting the token to transmit an identity proxy ID 2, whereby the computer system can identify the correct Key 1b (t), Key 2 or Key 3 associated with that particular ID 2 upon the token's transmission thereof, wherein the computer system stores a token profile comprising the association information among ID 2, Key 1b (t), Key 2, and Key 3.

Preferably, the data input from the computer system may comprise data generated using random data. Preferably, the data input from the computer system may comprise data generated using ID 2, Key 2 or Key 3.

Preferably, the authentication method may further comprise the steps of: the user entering, into a local keyboard, a test message; the local computer screen displaying a response message to be communicated to the token; and the token displaying a verification message derived from the response message, whereby the computer system's possession of Key 3 used for generating the response message is verified, wherein the response message from the computer system is generated using Key 3, wherein the response message from the computer system further comprises Key 1b (t) to be used in conjunction with Key 1a (t) stored in the token to derive Key 1 (t) whereby the token decrypts an encryption key Key 2 using Key 1 (t), and Key 2 is used to decrypt Key 3 stored in the token so that the verification message displayed to the user matches the test message user initially entered.

Preferably, the test message may be a Hex or Text phrase. Preferably, the response message from the computer system may further comprise information based on ID 2, whereby the token with the correct ID 2 can derive the correct verification message.

Preferably, the response message from the computer system may be communicated to the token through an optical sensor 100. Preferably, the response message from the computer system may be communicated to the token by the local computer screen displaying an image to be sensed by the token's optical sensor 100. Preferably, the displayed image may comprise a pattern. Preferably, he displayed image may comprise a changing pattern over time.

According to a second aspect of the present invention, there is provided a method of updating a key in a secure access token comprising the steps of: a computer system requesting the token to transmit an identity proxy ID 2 and generating a new key Key 3'; the token transmitting ID 2; the computer system identifying the correct Key 1b (t), Key 2 or Key 3 associated with that particular ID 2 from a stored token profile comprising the association information among ID 2, Key 1b (t), Key 2, and Key 3, wherein Key 1b (t) is used in conjunction with Key 1a (t) stored in the token to derive Key (1) whereby the token decrypts an encryption key Key 2 using Key 1(t), and Key 2 is used to decrypt Key 3 stored in the token; the computer system sending a Key 3 update message encrypted with Key 2, wherein the Key 3 update message comprises Key 1b (t) associated with ID 2 so that Key 2 can be decrypted in the token; the token decrypting Key 3 using the decrypted Key 2 and replacing it with Key 3'; and the computer system updating the token profile stored therein to comprise ID 2, Key 1b (t), Key 2, and Key 3'.

Preferably, the key generation step may comprise a step of using a dynamic system nonce in conjunction with imported random data from a third party source to generate an instantaneous data.

Preferably, the Key 3 update message may be communicated to the token periodically. Preferably, the Key 3 update message may be communicated to the token randomly. Preferably, the Key 3 update message may be communicated to the token each time the token establishes a communication with the computer system.

Preferably, the Key 3 update message may be communicated to the token through an optical sensor 100. Preferably, the Key 3 update message may be communicated to the token by a local computer screen displaying an image to be sensed by the token's optical sensor 100. Preferably, the displayed image may comprise a pattern. Preferably, the displayed image may comprise a changing pattern over time.

Preferably, the Key 3 update message may comprise random data. Preferably, the Key 3 update message may comprise ID 2. Preferably, the computer system may continue to send the Key 3 update messages with new keys until a valid response is received from the token.

According to a third aspect of the present invention, there is provided a method of updating a key in a secure access token comprising the steps of: the token transmitting an identity proxy ID 1 encrypted with an encryption key Key 1 (c) to a computer system wherein Key 1 (c) is stored; the computer system decrypting ID 1 and generating an associated identity proxy ID 2 and a new encryption key Key 1 (t); the computer system generating data Key 1a (t) and Key 1b (t) from Key 1 (t), whereby Key 1 a (t) and Key 1b (t) can be used in conjunction to derive Key 1 (t) but not separately; the computer system generating a new encryption key Key 2; the computer system communicating a key set information comprising ID 2, Key 1a (t) and Key 2 to the token; the token updating Key 1a (c) stored therein with Key 1a (t) and storing ID 2 and Key 2, wherein Key 2 is stored encrypted with Key 1 (t);

Preferably, the method of updating a key in a secure access token further comprises the steps of: the computer system recording a token profile comprising an association information among ID 2, Key 1b (t) and Key 2; and the computer system communicating the token profile to an authentication server.

Preferably, the method of updating a key in a secure access token may further comprise the step of: deleting Key 2 from the computer system.

Preferably, the token profile communication may comprise the step of establishing a private secure channel. Preferably, the establishment of the secure channel may be temporary. Alternatively the token profile may be communicated using a secure recorded media form.

Preferably, the key set information from the computer system may be communicated to the token using a duplex data interface 140. Preferably, the duplex data interface 140 may comprise an Infra-Red transmitter and an Infra-Red receiver.

Preferably, the key generation step may comprise a step of using a dynamic system nonce in conjunction with imported random data from a third party source to generate an instantaneous data.

According to a fourth aspect of the present invention there is provided a means of batch updating a plurality of secure access tokens, comprising: an entrance to accept the tokens; an exit to expel the tokens; a Read/Write cradle to receive a token; a wireless communication device to establish a communication channel with the token; and a computer to communicate with the token wherein the computer is connected to the wireless communication device and the Read/Write cradle, wherein the wireless communication device and the Read/Write cradle are placed in proximity thereto whereby a communication channel between the token and the computer can be established.

Preferably, the entrance may further comprise a hopper wherein a token can be placed. Preferably, the entrance hopper releases the token onto a conveyor.

Preferably, the communication between the token and the computer may comprise the token broadcasting an identity proxy ID 1 encrypted with an encryption key Key 1. Preferably, the communication between the token and the computer may further comprise the computer requesting for ID 1. Alternatively the communication between the token and the computer may comprise the token transmitting an identity proxy ID 2 upon a request by the computer.

Preferably, the communication between the token and the computer may comprise instructions to store, delete or replace the identity proxies or the encryption keys stored in the token. Preferably, the communication between the token and the computer may comprise an authentication communication between the token and the computer, whereby the authenticity or the functioning of the token can be assessed.

Preferably, the exit may be connected to the computer whereby it can be informed of the token's authenticity or functioning parameters. Preferably, the exit may further comprise a sorting means whereby the tokens are sorted according to their authenticity or functioning parameters. Preferably, the exit may further comprise two hoppers, one for the properly authenticated or functioning tokens and the other for those that are not.

According to a fifth aspect of the present invention, there is provided an authentication method for administering and authenticating a token with an administrative server and an authentication server, the method comprising the steps of: the token transmitting an identity proxy ID 1 encrypted with an encryption key Key 1; the administrative server generating data Key 1a and Key 1b from Key 1 stored therein, whereby Key 1a and Key 1b can be used in conjunction to derive Key 1 but not separately; the administrative server generating an identity proxy ID 2 and an encryption key Key 2, whereby the administrative server records a token profile comprising an association information among ID 2, Key 1b and Key 2; the administrative server communicating ID 2, Key 1a and Key 2 to the token and the token storing ID 2, Key 1a and Key 2 wherein Key 2 is stored therein encrypted with Key 1; the administrative server communicating the token profile to the authentication server and deleting Key 1b and Key 2 from its records thereafter; the authentication server requesting ID 2 from the token and the token transmitting ID 2 thereto; the authentication server identifying Key 1b and Key 2 associated with the transmitted ID 2 and generating a new encryption key Key 3; the authentication server recording Key 3's association with ID 2 in the token profile and communicating Key 3 to the token; and the token storing Key 3 therein encrypted with Key 2.

According to a sixth aspect of the present invention, there is provided a key management method for administering a token with an administrative server and an authentication server wherein a set of keys stored therein in use differs so that at least a mutually exclusive key is stored in each of the token, the administrative server or the authentication server, the method comprising the steps of: the token transmitting an identity proxy ID 1 encrypted with an encryption key Key 1; the administrative server generating data Key 1a and Key 1b from Key 1 stored therein, whereby Key 1a and Key 1b can be used in conjunction to derive Key 1 but not separately; the administrative server generating an identity proxy ID 2 and an encryption key Key 2, whereby the administrative server records a token profile comprising an association information among ID 2, Key 1b and Key 2; the administrative server communicating ID 2, Key 1a and Key 2 to the token and the token storing ID 2, Key 1a and Key 2 wherein Key 2 is stored therein encrypted with Key 1; the administrative server communicating the token profile to the authentication server and deleting Key 1b and Key 2 from its records thereafter; the authentication server requesting ID 2 from the token and the token transmitting ID 2 thereto; the authentication server identifying Key 1b and Key 2 associated with the transmitted ID 2 and generating a new encryption key Key 3; the authentication server recording Key 3's association with ID 2 in the token profile and communicating Key 3 to the token; and the token storing Key 3 therein encrypted with Key 2, whereby the administrative serve stores ID 1, ID 2 and Key 1, the authentication server stores ID 2, Key 1b, Key 2, and Key 3, and the token stores ID 1, ID 2, Key 1a, Key 2, and Key 3, wherein the token stores Key 2 encrypted with Key 1 and stores Key 3 encrypted with Key 2 therein.

For a better understanding of the invention, and to show how embodiments of the same may be carried into effect, reference will now be made, by way of example, to the accompanying diagrammatic drawings in which.

Figure 1A:
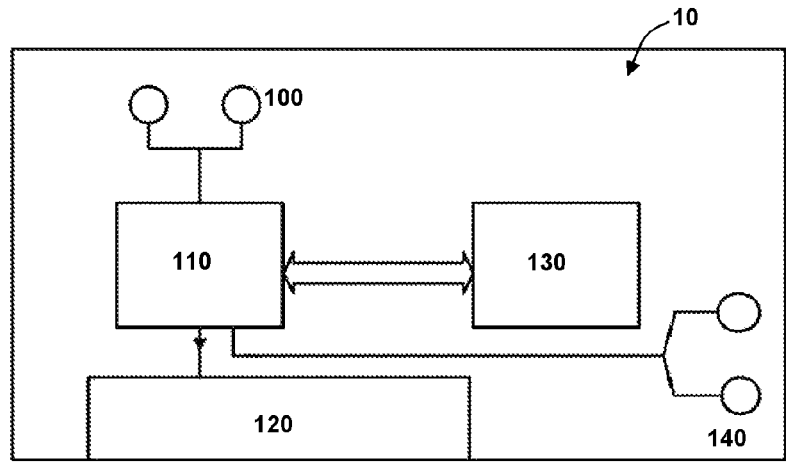
FIG. 1a shows a schematic of a token according to an embodiment of the invention.

FIG. 1a shows a token 10 schematic according to an embodiment of the present invention. The token comprises a General Micro Controller 110, a Secure Micro Controller 130, sensors 100 and 140, and a Display 120. The General Micro Controller 110 controls the sensors 100, 140 and the display 120. It also communicates with the Secure Micro Controller 130. The Secure Micro Controller 130 performs all cryptographic functions and stores keys used for the authentication. The sensor 140 is a duplex data interface 140. The duplex data interface 140 may comprise an Infra-Red transmitter and an Infra-Red receiver. The sensor 100 is an optical sensor 100 for detecting a signal or a pattern displayed on a display of an external device-workstation or laptop that the user operates.

The optical sensor 100 enables a Challenge-Response protocol to be used with the token, wherein a pattern displayed on the display of an external device, for example a computer screen, is received by the optical sensor 100 and used as an incoming data containing a challenge, to which either the General Micro Controller 110 or the Secure Micro Controller 130 (or both) generates a response, which is then displayed on the display 120. A user of the token may then type in the response displayed on the display 120 into the computer. The generation of the expected response to the challenge can only occur if the correct set of keys is stored in the token. This enables the computer to verify the authenticity of the token, and hence the user's identity.

Figure 1B:
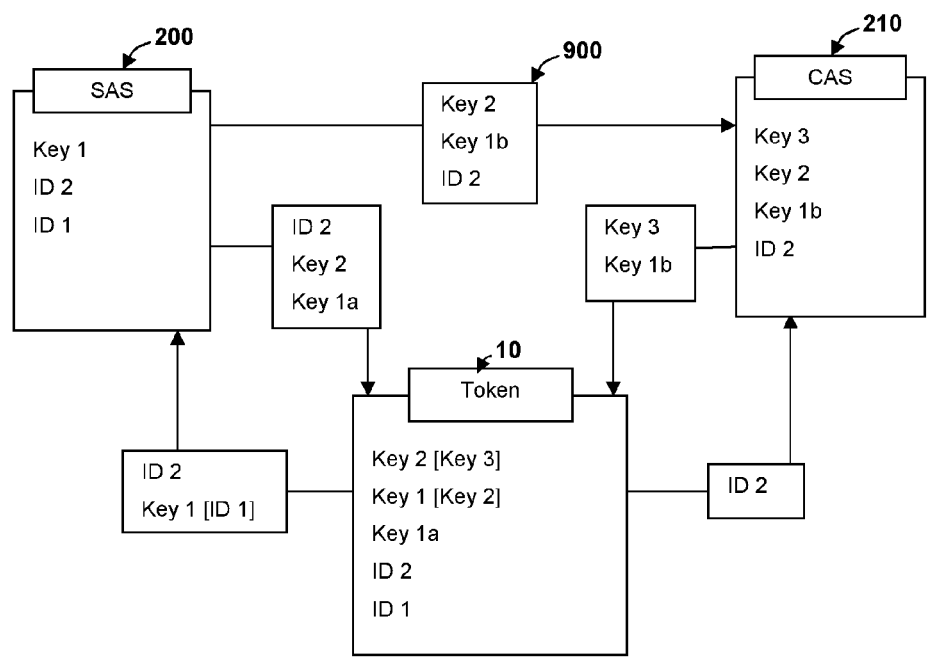
FIG. 1b shows an authentication method according to an embodiment of the invention.

FIG. 1b shows a message exchange schematic of an authentication method according to an embodiment of the invention wherein a SAS 200, a CAS 210 and a token 10 each possess a different set of keys. The Stand Alone Server (SAS) 200 populates and updates the tokens 10 with keys and IDs. A communication channel for carrying out such population and updates may use a contactless interface such as the duplex data interface 140. The Authentication Server (CAS) 210 verifies the authenticity of the token 10 in use. The CAS 210 produces challenges to be sent to the token 10 using the Challenge-Response protocol whereby the authenticity of the token can be verified and even keys stored in the token updated. A communication channel for such verification and updates may comprise that established using the optical sensor 100.

In this embodiment the authentication method is based on the use of stored data sets which are used in symmetric encryption algorithms (Key) and as identity proxies (ID). Where a new key is generated, a dynamic system nonce may be used to generate an instantaneous key. Imported random data from a third party source may also be used as a seed for generating a random instantaneous key. The SAS 200 possesses ID 1, ID 2 and Key 1, the CAS 210 possesses ID 2, Key 2, Key 1b, and Key 3, and the token 10 possess ID 1, ID 2, Key 1a, Key 2 and Key 3. Key 2 may be stored in the token encrypted with an encryption key Key 1 represented as Key 1[Key 2] in FIG. 1b. Key 3 may be stored in the token encrypted with Key 2 (Key 2 [Key 3] in FIG. 1b). Key 1a and Key 1b are generated from Key 1 such that Key 1a and Key 1b alone cannot reveal Key 1. When Key 1a and Key 1b are provided, they can be used in conjunction to derive Key 1.

In an embodiment of the present invention, Advanced Encryption Standard (AES) Key Wrap Algorithm according to the AES Key Wrap Specification is used to generate Key 1a and Key 1b from Key 1. In this embodiment Key Encryption Key (KEK) used in the AES Key Wrap Algorithm is also stored to enable the wrapping or unwrapping of Key 1 to be carried out wherever required. In an embodiment, Ciphertext may be Key 1a and the other values produced from the Wrap algorithm may be Key 1b or vice versa. Key 1 is then derived by inputting Key 1a and Key 1b along with KEK to the AES Key Wrap Algorithm.

In an embodiment of the present invention, Key 2 cannot be decrypted with just the keys stored in the token 10. Only when the token receives Key 1b can it use it together with Key 1a to derive Key 1 and hence decrypt Key 2. This ensures a perpetrator, who may have gained access to the keys in the token 10, cannot access or change Key 2 without gaining access to Key 1 or Key 1b stored in the SAS 200 or the CAS 210 respectively.

The SAS 200 and the CAS 210 can also initiate a token state change wherein the token state represents a key possession state of the token 10, namely a set of keys stored therein. On receiving ID 1 or ID 2 from the token 10, wherein ID 1 or ID 2 may be encrypted with Key 1 and is communicated by the token in this encrypted form (represented as Key 1 [ID 1] in FIG. 1b), the SAS 200 recognises the token by ID 1 or ID 2 and initiates the key possession state change of the token by embedding, removing or updating a key or ID stored in the token using an appropriate message encrypted with keys available to the Token.

In general, ID 1 is a static ID and hence is not changed after the token is manufactured. The token 100 can communicate ID 1 to the SAS 200 when requested. The duplex data interface 140 may be used for this communication. This communication may take the form of a broadcast wherein ID 1 is broadcasted encrypted with Key 1 as shown in FIG. 1*b*. On receiving and decrypting ID 1 using Key 1, the SAS 200 embeds ID 2 into the token 10 thereafter. When requested the token will then only communicate ID 2 to identify itself. This communication may take the form of a broadcast using the duplex data interface 140. ID 2, initially embedded in the token by the SAS 200 before the token deployment to a user, will only be removed or updated when the token 10 needs to be reset due to security concerns or due to a reassignment requirement in another deployment.

The SAS 200 generates Key 1*a* and Key 1*b* from Key 1. The SAS 200 also generates Key 2. The SAS 200 then uses the same process described above to embed Key 1*a* and Key 2 in the token 10, wherein Key 2 may be stored therein encrypted with Key 1. After recording the association of ID 2 with Key 1 and Key 2, and communicating this to the CAS, the SAS deletes Key 2 from its memory. The association of ID 2 with Key 1 also associates ID 2 to Key 1*a* and Key 1*b*, and this association of ID 2 with Key 1*b* is what is in fact communicated to the CAS since the CAS stores Key 1*b*. This association is stored in a form of a token profile 900. The token profile 900 may comprise information on associated ID 2, Key 1*b* and Key 2.

In an embodiment of the present invention, Advanced Encryption Standard (AES) Key Wrap Algorithm according to the AES Key Wrap Specification is used to generate Key 1*a* and Key 1*b* from Key 1. In this embodiment Key Encryption Key (KEK) used in the AES Key Wrap Algorithm is also stored to enable the wrapping or unwrapping of Key 1 to be carried out wherever required. KEK may also be stored encrypted.

Key 2 and Key 1, and therefore associated Key 1*a* and Key 1*b*, are generated by the SAS 200 before the token 10 deployment to the user. Token profiles 900 comprising ID 2, Key 1*b* and Key 2 are delivered to the CAS 210 by means of a private secure channel or removable recorded media. Then the CAS 210 generates an individual Key 3 when it first communicates with a token 10. Key 3 may be stored in the token 10 encrypted with Key 2. In such a case in order to decrypt Key 3, Key 1 will have to be derived from Key 1*a* and Key 1*b*, then Key 2 is decrypted with the derived Key 1, and the decrypted Key 2 is used to decrypt Key 3.

The following table summarises types of messages a token 10 and a SAS 200 or a CAS 210 might communicate to each other according to an embodiment of the present invention. This table supplements the description of the embodiments shown in FIGS. 2*a*-2*h*. (m) denotes "manufacturer", (c) "customer default", and (t) denotes "token and time specific", i.e. the value of a specific key in a specific token at a specific time.

| Message No | Message Type | Initiator | Communication key | Initiator needs to know |
|---|---|---|---|---|
| 1 | Get ID 1 (FIGS. 2a, 2b, 2c) | SAS | Key 1 (m) or Key 1 (c) | Key 1b (m) or Key 1b (c) |
| 2 | Set Customer Default (FIG. 2b, 2h) | SAS | Key 1 (m) or Key 1 (t) | Key 1b (m) or Key 1b (t) ID 1 or ID 2 |
| 3 | Set Token Profile (FIG. 2c, 2g) | SAS | Key 1 (c) | Key 1b (c) ID 1 |
| 4 | Transmit ID 2 (FIG. 2g, 2h) | SAS | Clear | — |
| 5 | Update Token Profile (FIG. 2g) | SAS | Key 1 (t) | Key 1b (t) ID 1 or ID 2 |
| 6 | Challenge (FIG. 2e) | CAS | Key 3 | Key 1b (t) ID 2 |
| 7 | Challenge Update Key 3 (FIG. 2f) | CAS | Key 2 | Key 1b (t) ID 2 |
| 8 | Display Text/Hex (FIG. 2e) | CAS | Key 3 | Key 1b (t) ID 2 |

Figure 2A:
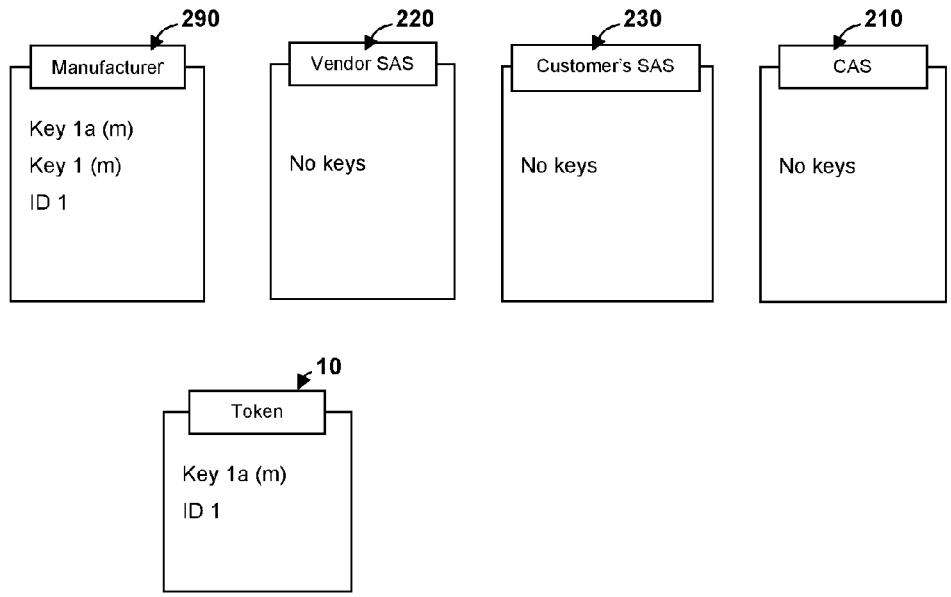
FIG. 2a shows key possession states of a token shown in FIGS. 1a and 1b in a manufacturing stage.

FIG. 2*a* shows the key possession states at the token's manufacturing stage according to an embodiment of the present invention. A Manufacturer 290 produces tokens 10 wherein Key 1*a* (m) and ID 1 are stored. ID 1 is stored in the token 10. ID 1 is broadcasted by the token 10 encrypted with a key, Key 1 (m), when prompted. The same Key 1 (m) can be used for a batch of manufactured tokens.

Key 1*a* only represents a portion of the corresponding Key 1 and hence an infiltrator cannot obtain the full Key 1 from Key 1*a*. Key 1 can be used to generate Key 1*a* and Key 1*b*. Key 1*a* and Key 1*b* can then be used in conjunction to derive the full Key 1. In communications to the token 10 where Key 1 is used, the communication message contains Key 1*b*, which can be used in conjunction with Key 1*a* stored in the token 10 to reveal the full Key 1. The AES Key Wrap Algorithm with KEK may be used to generate Key 1*a* and Key 1*b*, and to reveal Key 1 from them.

Figure 2B:
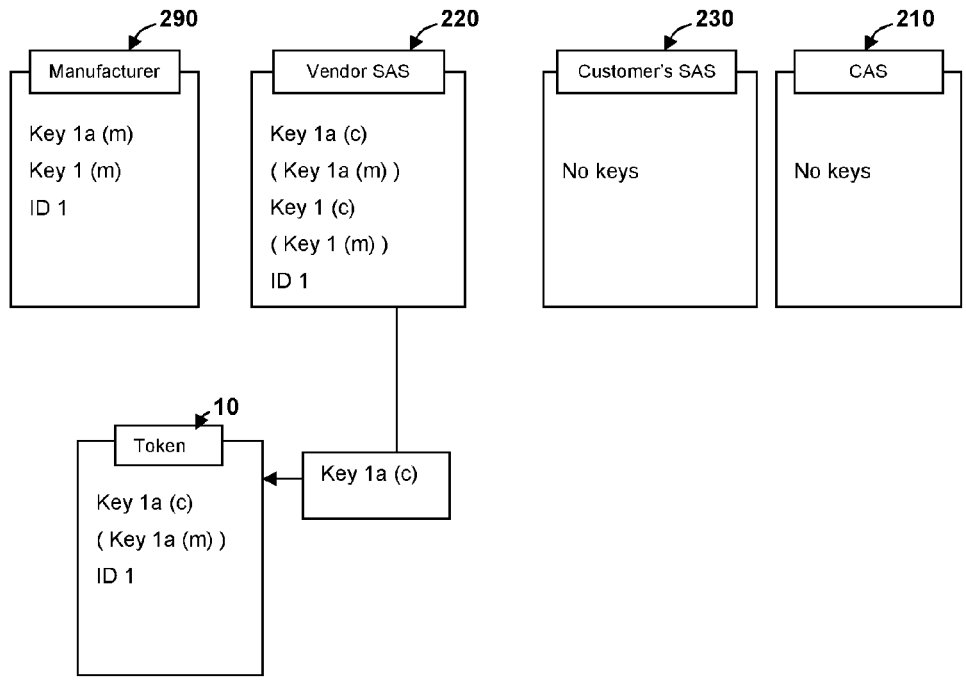
FIG. 2b shows key possession states at pre-deployment stage wherein a Vendor prepares the token shown in FIG. 2a for a customer.

FIG. 2*b* shows key possession states at a pre-deployment stage wherein a Vendor SAS 220 prepares the token shown in FIG. 2*a* for a Customer's SAS 230. After receiving key information comprising Key 1 (m) from the Manufacturer 290, the Vendor SAS 220 generates a customer default Key 1, namely Key 1 (c), for a specific customer to be used on a specific batch of tokens to be deployed by that specific customer. The key information is received in a secure recorded media form. The Vendor SAS 220 then replaces Key 1*a* (m) stored in the token 10 with Key 1*a* (c). This replacement of the keys may be performed using a secure communication channel established on the duplex data interface 140 using Key 1 (m). The duplex data interface 140 may comprise an Infra-Red transmitter and an Infra-Red receiver. The parentheses in FIG. 2*b* represent deleted or replaced keys.

In order to ensure that a message received by the Token 10 is specifically for that Token, the Token's unique ID 1 may appear in the message data. The Vendor SAS 220 sends a "Get ID 1" request to which the token 10 responds with a broadcasting of its ID 1 encrypted with Key 1 (m) or Key 1 (c).

Figure 2C:
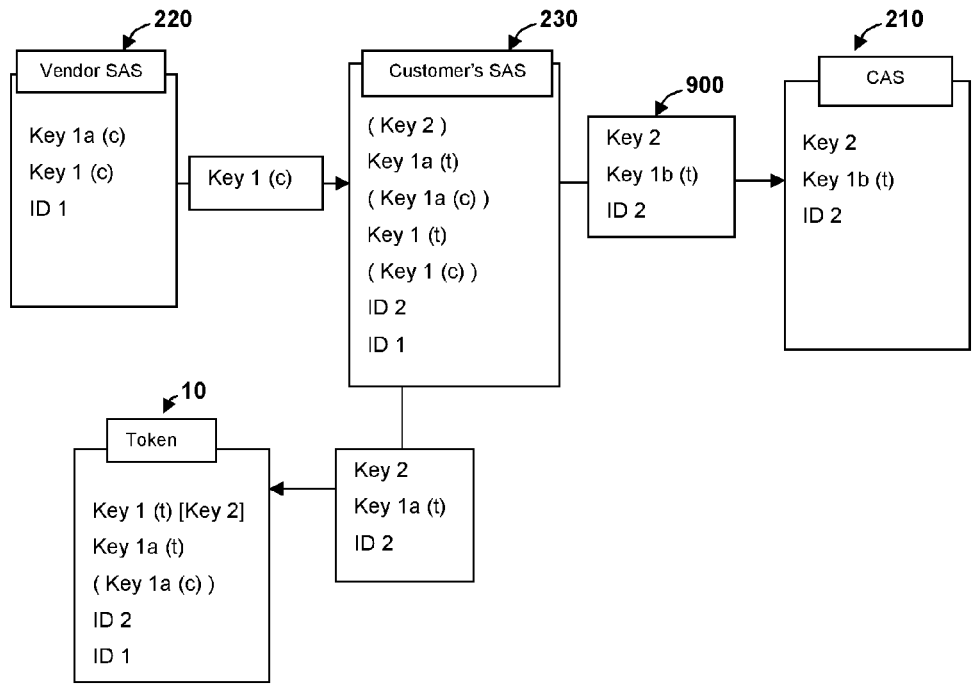
FIG. 2c shows key possession states during a token set-up stage wherein the token shown in FIG. 2b is being prepared for use.

FIG. 2c shows key possession states during a token set-up stage wherein the token 10 shown in FIG. 2b is being prepared by the Customer's SAS 230 for use. After receiving key information comprising Key 1 (c) from the Vendor SAS 220, the Customer's SAS 230 generates individual Key 1 (t) for each token 10, replacing Key 1 (c) with Key 1 (t). Accordingly the Customer's SAS 230 then replaces the token's 10 Key 1a (c) with Key 1a (t). The Customer's SAS 230 also generates and adds further individual token keys, namely Key 2 and ID 2 for each token 10. When a new key generation is required, a dynamic system nonce may be used in conjunction with imported random data from a third party source to help generate an instantaneous data thereby ensuring that third parties cannot predict the value of the keys generated. The parentheses represent deleted or replaced keys.

Key 1 (t) is not known to either the Manufacturer 290, the Vendor 220 or the token 10, therefore should any one of these entities, namely the Manufacturer 290, the Vendor 220 or the token 10, be compromised the full set of keys in the other entities remain uncompromised. This ensures any compromise on the Manufacturer 290, the Vendor 220 or the token 10 does not affect the security of the token authentication system in use by the customer, for example the authentication system employed for a communication between the Customer's SAS 230 and the token 10.

The Customer's SAS 230 communicates a token profile 900 to the CAS 210. A private secure channel is established for this token profile 900 communication. The establishment of the secure channel might be temporary. Alternatively the token profile 900 may be communicated to the CAS 210 using a secure recorded media form. The token profile 900 comprises ID 2, Key 1b (t) and Key 2. Key 2 may be stored encrypted with Key 1 (t) as represented by Key 1 (t) [Key 2] in FIG. 2c.

After the token profile 900 communication, the Customer's SAS 230 deletes Key 2 from its memory. This deletion may take place as soon as the token profile 900 is written and recorded.

Figure 2D:
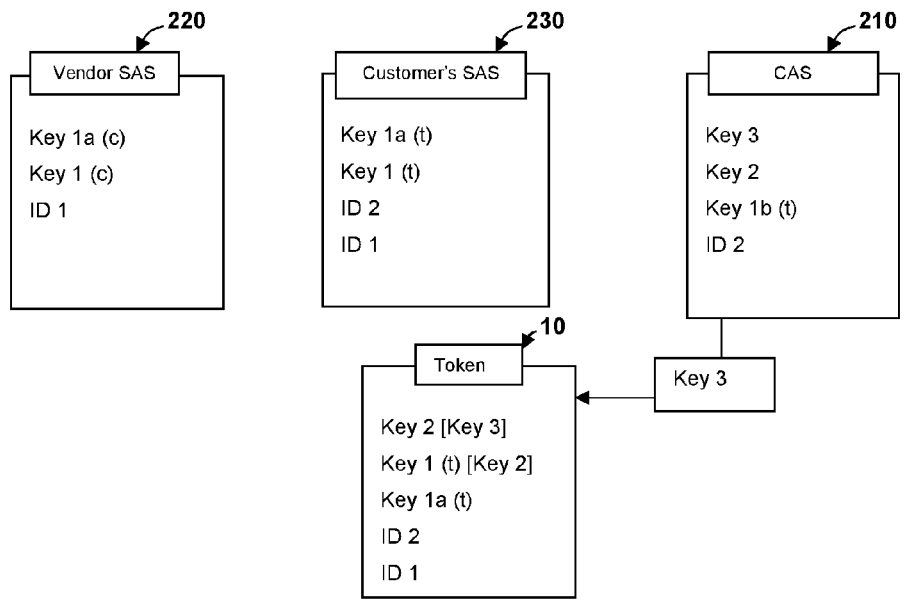
FIG. 2d shows key possession states during the first communication for authenticating the user's token shown in FIG. 2c takes place.

FIG. 2d shows key possession states during the first communication between the CAS 210 and the token 10 shown in FIG. 2c. The CAS 210 generates a new key Key 3 and during the first communication adds Key 3 to the token 10. The communication thereof may be over a secure channel encrypted with Key 2. Key 3 may be stored encrypted with Key 2 as represented by Key 2 [Key 3] in the FIG. 2d.

In an embodiment of the present invention, the message content and responses comprise sufficient information to ensure that the token's 10 integrity is always maintained. For example, use of an increasing counter will ensure no replay of any previous message or communication is possible. Key 3 update must be validated correctly or another update Key 3 message with a new different key must be sent until valid acknowledgement is received by the CAS 210. In this embodiment of the present invention, both the CAS 210 and the token 10 may also maintain a common "generation" or "counter" number to ensure that the token 10 cannot be returned to an earlier unsynchronised state by preventing the acceptance of a past recorded message to return the token 10 to the unsynchronised state.

In this embodiment of the present invention, a complete separation of each entity's key possession states is achieved. The Vendor SAS 220, the Customer's SAS 230, the CAS 210, and the token 10 each has a different set of keys so compromising one of the entities should not lead to full compromise of the whole system. The token 10 does not know the full Key 1 (t), the CAS 210 does not know ID 1 or full Key 1 (t), the Customer's SAS 230 does not know Key 2 or Key 3, and the Vendor SAS 220 only knows ID 1, Key 1 (c) and Key 1a (c).

Figure 2E:
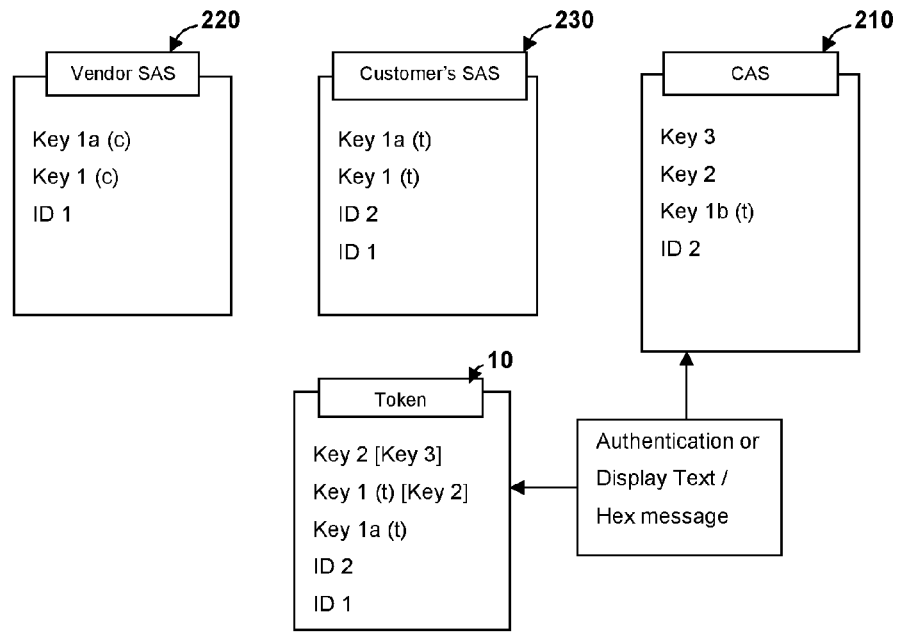
FIG. 2e shows key possession states when mutual authentication takes place according to an embodiment of the invention.

FIG. 2e shows key possession states in use when mutual authentication takes place between the token 10 and the CAS 210 shown in FIG. 2d.

The CAS 210 verifies the authenticity of the token 10 by sending a challenge and analysing the response to this challenge. This challenge is based on random data and may be received through a communication channel established using the token's optical sensor 100. This challenge may also be based on any information stored in both the CAS 210 and the token 10, for example ID 2, Key 2 or Key 3. The response from the token 10 to the CAS 210 challenge may be displayed on the token's display.

The CAS 210 can also echo back a user created Hex or Text phrase which is then read by the token's sensors 100/140 and displayed back to the user on the token's display 120. The message may contain ID 2 to allow the token 10 to know that the message is intended for it alone. This enables the user to authenticate the identity of the CAS 210 since only the CAS 210 with the right set of keys would be able to echo back the Hex or Text phrase correctly.

Figure 2F:
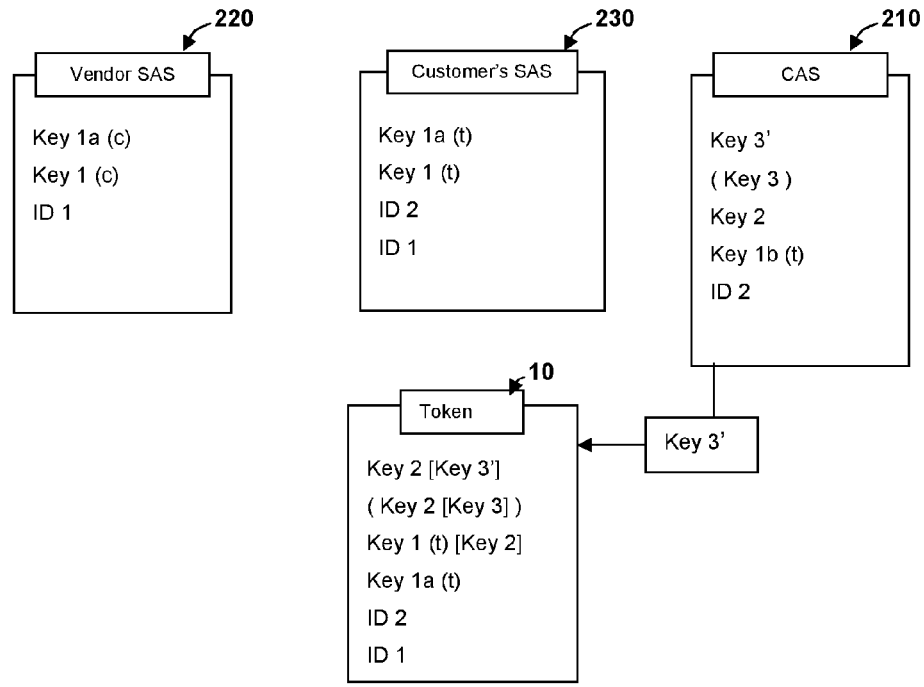
FIG. 2f shows key possession states when key update takes place according to an embodiment of the invention.

FIG. 2f shows key possession states in use when a key update takes place. This key update may take place periodically so that an infiltrator can be identified when the imposter token and the genuine token 10 have a different key possession states due to the key update having been performed on only one of them. The key update may take place at each communication between the CAS 210 and the token 10. Alternatively, the key update may take place periodically or randomly.

To perform the key update, the CAS 210 generates a new key Key 3' and establishes a secure communication channel with the token 10 using Key 2 to replace the stored Key 3 with Key 3'. The message may contain random data and also ID 2 for token verification. The CAS 210 deletes Key 3 once the replacement with Key 3' in the token 10 is verified but may continue to send update Key 3 messages with new keys until a valid response is received from the token 10. The parentheses represent deleted or replaced keys.

Figure 2G:
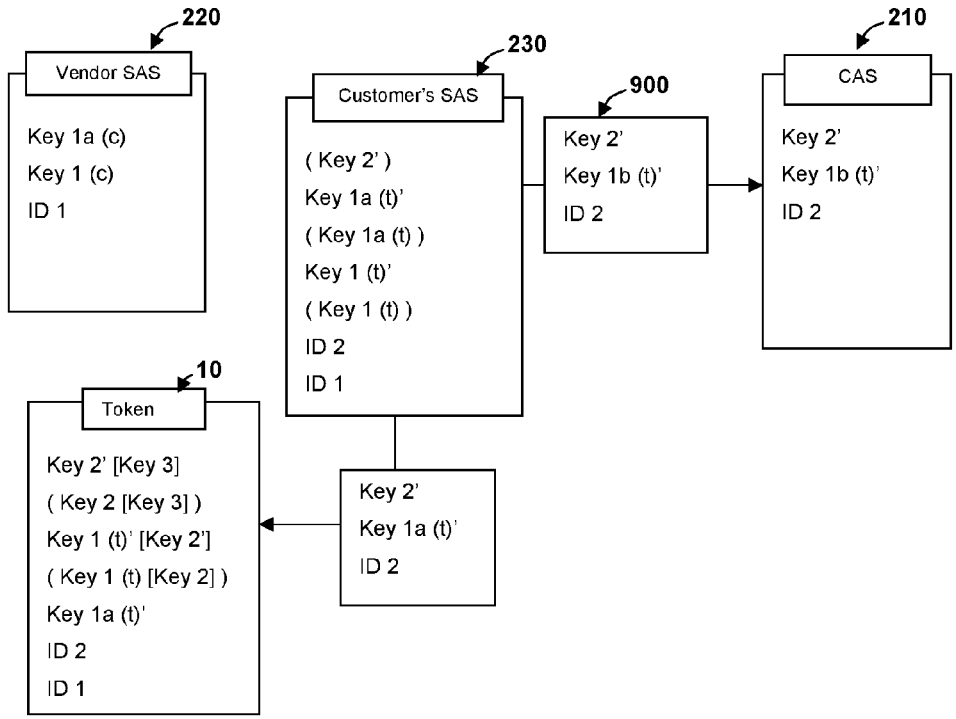
FIG. 2g shows key possession states when a token profile of a token which has previously been set-up as shown in FIG. 2c is being updated.

FIG. 2g shows key possession states when the Customer's SAS 230 updates a token profile 900 of a token 10 which has previously been set-up as shown in FIG. 2c. The Customer's SAS 230 generates a new keys Key 1 (t)', Key 1a (t)' and Key 2', then replaces Key 1a (t) and Key 2 in the token 10 with Key 1a (t)' and Key 2' respectively. ID 2 is unchanged and identifies the token 10 as the intended message recipient. As described below, similar processes to that described for FIG. 2c is used mutatis mutandis. The parentheses represent deleted or replaced keys.

This communication may be performed using a communication channel established on the duplex data interface 140. The duplex data interface 140 may comprise an Infra-Red transmitter and an Infra-Red receiver. The Customer's SAS 230 communicates a token profile 900 to the CAS 210 as previously described.

Figure 2H:
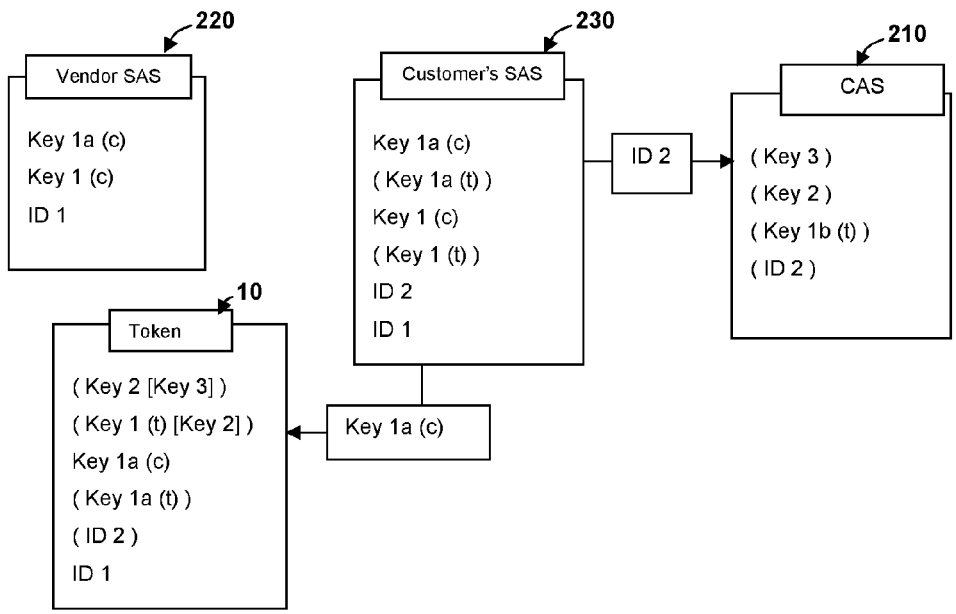
FIG. 2h shows resetting of a token to its state at the pre-deployment stage shown in FIG. 2b.

FIG. 2h shows key possession states when the Vendor 220 or the Customer's SAS 230 resets a token 10 which has previously been set-up according to the processes described for FIG. 2c. The Vendor 220 or the Customer's SAS 230 resets the token 10 so that Key 2 and ID 2 are deleted whilst Key 1a (t) is replaced with Key 1a (c). Key 1a (c) may be from a secure recorded medium produced by the Vendor SAS 220. Key 1a (c) may be derived from Key 1 (c) stored in the secure recorded medium produced by the Vendor SAS 220. The parentheses represent deleted or replaced keys.

The Vendor 220 or the Customer's SAS 230 communicates this resetting of the token 10 to the CAS 210, indicating ID 2 for the reset token is no longer active. The CAS 210 removes the token profile with the reset token's ID 2 from its memory. Alternatively the CAS 210 may just record the token profile with the reset token's ID 2 to be inactive and apply this status to the authentication system. A secure channel employing an encryption may be established for this communication. The establishment of this secure channel might be temporary. Alternatively this communication may use a secure recorded media form.

Figure 3:
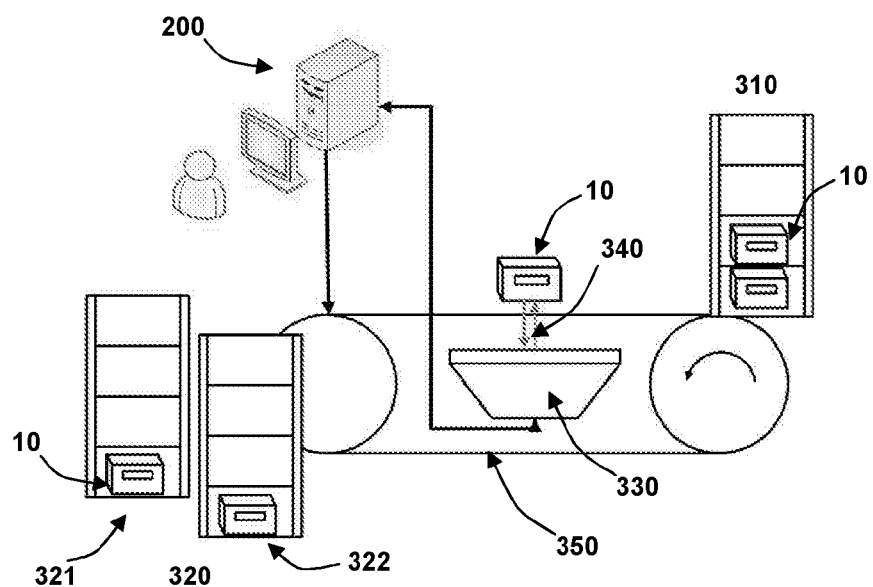
FIG. 3 shows a hopper system to automatically set-up, update or reset tokens according to an embodiment of the present invention.

FIG. 3 shows a hopper system to set-up, update or reset tokens 10. A hopper system comprises an entrance 310, an exit 320, a Read/Write cradle 330, a computer 200, and a wireless communication device 340. A token 10 is introduced to the hopper system via the entrance 310, carried through the Read/Write cradle 330 and then collected at the exit 320. This computer may refer to that used by the Manufacturer 290, the Vendor 220 or the Customer's SAS 230 in FIGS. 2a-2c or FIGS. 2g-2h.

The entrance 310 comprises a hopper wherein a token 10 is placed. The entrance hopper 310 releases a token 10 onto a conveyor 350, wherein the wireless communication device 340 and the Read/Write cradle 330 are placed in proximity thereto so that they can interact with the token 10 thereon. The computer is connected to the wireless communication device 340 and the Read/Write cradle 330 to initiate and to receive response from this interaction with the token 10. The Token 10 either broadcasts its ID 2 in which case the Vendor 220 or the Customer's SAS 230 can update token profile 900 or reset to customer default as in FIG. 2g or 2h. If the Token 10 does not broadcast its ID 2 then the token 10 has not been setup so the Vendor 220 or the Customer's SAS 230 can issue a "Get ID 1" message and then proceed to initial setup as shown in FIG. 2b or 2c. This interaction comprises the communication to store, delete or replace the keys stored in the token 10 as described in FIG. 2a-2c or 2g-2h.

This interaction may comprise authentication communication between the token 10 and an entity, such as the Manufacturer 290, the Vendor 220 or the Customer's SAS 230, whereby the authenticity or the functioning of the token 10 is assessed. The exit 320 may be connected to the entity such as the SAS 200 whereby it can be informed of the token's authenticity or functioning parameters. The exit 320 may further comprise a sorting means whereby the tokens 10 are sorted according to their authenticity or functioning parameters. The exit 320 may comprise two hoppers one for the properly authenticated or functioning tokens 321 and the other for those that are not 322.

Embodiments of the present invention advantageously address problems associated with prior art authentication systems. In particular symmetric key based authentication systems will benefit from the reduced administrative overhead in key distribution and key change. The embodiments of the present invention reduces the reliance of the whole system on keeping all the keys secret, which can be a weakness in a Public-Private-key based systems, and enables the use of the symmetric key based authentication systems in an industrially viable scale. The separation of each entity's key possession states and the possibility of easily updating various keys either periodically or in use also provide additional layers of protection against any potential security breach or attacks.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A key management method for administering a token with an administrative server and an authentication server wherein a set of keys stored therein in use differs so that at least a mutually exclusive key is stored in each of the token, the administrative server or the authentication server, the method comprising the steps of:
   the token transmitting an identity proxy ID 1 encrypted with an encryption key Key 1;
   the administrative server generating data Key 1a and Key 1b from Key 1 stored therein, whereby Key 1a and Key 1b can be used in conjunction to derive Key 1 but not separately;
   the administrative server generating an identity proxy ID 2 and an encryption key Key 2, whereby the administrative server records a token profile comprising an association information among ID 2, Key 1b and Key 2;
   the administrative server communicating ID 2, Key 1a and Key 2 to the token and a micro controller of the token storing ID 2, Key 1a and Key 2 wherein Key 2 is stored therein encrypted with Key 1;
   the administrative server communicating the token profile to the authentication server and deleting Key 1b and Key 2 from a memory of the administrative server thereafter;
   the authentication server requesting ID 2 from the token and the token transmitting ID 2 thereto;
   the authentication server identifying Key 1b and Key 2 associated with the transmitted ID 2 and generating a new encryption key Key 3;
   the authentication server recording Key 3's association with ID 2 in the token profile and communicating Key 3 to the token; and
   the micro controller of the token storing Key 3 therein encrypted with Key 2, whereby the administrative server stores ID 1, ID 2 and Key 1, the authentication server stores ID 2, Key 1b, Key 2, and Key 3, and the micro controller of the token stores ID 1, ID 2, Key 1a, Key 2, and Key 3, wherein the micro controller stores Key 2 encrypted with Key 1 and stores Key 3 encrypted with Key 2 therein.

2. The management method of claim 1 further comprising an authentication method for authenticating the token with a computer system wherein the authentication method comprises steps of:
   displaying on the token a message to a user in response to the receipt of a data input to the token from a local computer screen;
   the user entering, into a local keyboard, the message; and allowing access to the computer system if the message entered into the local keyboard matches that expected by the computer system, whereby the token's possession of an encryption key Key 3 used for generating the data input is verified, wherein the data input from the computer system further comprises Key 1b to be used in conjunction with Key 1a stored in the token to derive Key 1 whereby the token decrypts an encryption key Key 2 using Key 1, and Key 2 is used to decrypt Key 3 stored in the token so that the message to the user can be generated using Key 3.

3. The management method of claim 2 wherein the data input from the computer system comprises data generated using random data, ID 2, Key 2 or Key 3.

4. The management method of claim 2 wherein the authentication method further comprises the steps of:
   the user entering, into a local keyboard, a test message;
   the local computer screen displaying a response message to be communicated to the token; and
   the token displaying a verification message derived from the response message, whereby the computer system's possession of Key 3 used for generating the response message is verified, wherein the response message from the computer system is generated using Key 3, wherein the response message from the computer system further comprises Key 1b to be used in conjunction with Key 1a stored in the token to derive Key 1 whereby the token decrypts an encryption key Key 2 using Key 1, and Key 2 is used to decrypt Key 3 stored in the token so that the verification message displayed to the user matches the test message user initially entered.

5. The management method of claim 4 wherein the response message from the computer system further comprises information based on ID 2, whereby the token with the correct ID 2 can derive the correct verification message.

6. The management method of claim 4 wherein the response message from the computer system is communicated to the token through an optical sensor 100 by the local computer screen displaying an image to be sensed by the token's optical sensor 100 wherein the displayed image comprises a pattern.

7. The management method of claim 1 further comprising a method of updating a key in a secure access token comprising the steps of:
   a computer system requesting the token to transmit an identity proxy ID 2 and generating a new key Key 3';
   the token transmitting ID 2;
   the computer system identifying the correct Key 1b, Key 2 or Key 3 associated with that particular ID 2 from a stored token profile comprising the association information among ID 2, Key 1b, Key 2, and Key 3, wherein Key 1b is used in conjunction with Key 1a stored in the token to derive Key 1 whereby the token decrypts an encryption key Key 2 using Key 1, and Key 2 is used to decrypt Key 3 stored in the token;
   the computer system sending a Key 3 update message encrypted with Key 2, wherein the Key 3 update message comprises Key 1b associated with ID 2 so that Key 2 can be decrypted in the token;
   the token decrypting Key 3 using the decrypted Key 2 and replacing it with Key 3'; and
   the computer system updating the token profile stored therein to comprise ID 2, Key 1b, Key 2, and Key 3'.

8. The management method of claim 7 wherein the key generation step comprises a step of using a dynamic system nonce in conjunction with imported random data from a third party source to generate an instantaneous data.

9. The management method of claim 7, wherein the computer system continues to send the Key 3 update messages with new keys until a valid response is received from the token.

10. The management method of claim 7 wherein the Key 3 update message is communicated to the token through an optical sensor 100 by:
    a local computer screen displaying an image to be sensed by the token's optical sensor 100 wherein the displayed image comprises a pattern.

11. The management method of claim 1 wherein the method of updating a key in the secure access token further comprises the steps of:
    the token transmitting an identity proxy ID 1 encrypted with an encryption key Key 1 (c) to a computer system wherein Key 1 (c) is stored;
    the computer system decrypting ID 1 and generating an associated identity proxy ID 2 and a new encryption key Key 1;
    the computer system generating data Key 1a and Key 1b from Key 1, whereby Key 1a and Key 1b can be used in conjunction to derive Key 1 but not separately;
    the computer system generating a new encryption key Key 2;
    the computer system communicating a key set information comprising ID 2, Key 1a and Key 2 to the token; and
    the token updating Key 1a (c) stored therein with Key 1a and storing ID 2 and Key 2, wherein Key 2 is stored encrypted with Key 1.

12. The management method of claim 11 wherein the method of updating a key in the secure access token further comprises the steps of:
    the computer system recording a token profile comprising an association information among ID 2, Key 1b and Key 2; and
    the computer system communicating the token profile to an authentication server.

13. The management method of claim 12 wherein the method of updating a key in the secure access token further comprises the step of deleting Key 2 from the computer system.

14. The management method of claim 11 wherein the key generation step comprises a step of using a dynamic system nonce in conjunction with imported random data from a third party source to generate an instantaneous data.

15. The management method of claim 11 wherein a means of batch updating a plurality of secure access tokens is provided, the means of batch updating comprising:
    an entrance to accept the tokens;
    an exit to expel the tokens;
    a Read/Write cradle to receive a token;
    a wireless communication device to establish a communication channel with the token; and
    a computer to communicate with the token wherein the computer is connected to the wireless communication device and the Read/Write cradle, wherein the wireless communication device and the Read/Write cradle are placed in proximity thereto whereby a communication channel between the token and the computer can be established.

16. The management method of claim 15 wherein the communication between the token and the computer comprises the token broadcasting an identity proxy ID 1 encrypted with an encryption key Key 1 and the computer requesting for ID 1, token transmitting an identity proxy ID 2 upon a request by the computer, or instructions to store, delete or replace the identity proxies or the encryption keys stored in the token and an authentication communication between the token and the computer, whereby the authenticity or the functioning of the token can be assessed.

17. An authentication method for administering and authenticating a token with an administrative server and an authentication server, the method comprising the steps of:

the token transmitting an identity proxy ID 1 encrypted with an encryption key Key 1;

the administrative server generating data Key 1a and Key 1b from Key 1 stored therein, whereby Key 1a and Key 1b can be used in conjunction to derive Key 1 but not separately;

the administrative server generating an identity proxy ID 2 and an encryption key Key 2, whereby the administrative server records a token profile comprising an association information among ID 2, Key 1b and Key 2;

the administrative server communicating ID 2, Key 1a and Key 2 to the token and a micro controller of the token storing ID 2, Key 1a and Key 2 wherein Key 2 is stored therein encrypted with Key 1;

the administrative server communicating the token profile to the authentication server and deleting Key 1b and Key 2 from a memory of the administrative server thereafter;

the authentication server requesting ID 2 from the token and the token transmitting ID 2 thereto;

the authentication server identifying Key 1b and Key 2 associated with the transmitted ID 2 and generating a new encryption key Key 3;

the authentication server recording Key 3's association with ID 2 in the token profile and communicating Key 3 to the token; and the micro controller of the token storing Key 3 therein encrypted with Key 2.

18. The management method of claim 1 wherein the key generation step comprises a step of using a dynamic system nonce in conjunction with imported random data from a third party source to generate an instantaneous data.

19. The management method of claim 2 wherein the data input to the token from the computer system is communicated to the token through an optical sensor 100 by a local computer screen displaying an image to be sensed by the token's optical sensor 100 wherein the displayed image comprises a pattern.

* * * * *